United States Patent [19]

Cranston et al.

[11] Patent Number: 5,380,768

[45] Date of Patent: Jan. 10, 1995

[54] FOAM, FOAM-RESIN COMPOSITE AND METHOD OF MAKING A FOAM-RESIN COMPOSITE

[75] Inventors: John A. Cranston, Huntsville; Doug E. MacArthur, New Market, both of Ala.

[73] Assignee: Martin Marietta Corporation, Bethesda, Md.

[21] Appl. No.: 64,869

[22] Filed: May 20, 1993

[51] Int. Cl.⁶ ............................................ C08G 18/00
[52] U.S. Cl. .................................. 521/167; 428/318.6; 428/319.3; 521/902
[58] Field of Search .............................. 521/167, 902; 428/318.6, 319.3

[56] References Cited

U.S. PATENT DOCUMENTS

| | | | |
|---|---|---|---|
| 3,297,597 | 1/1967 | Edwards et al. | 521/159 |
| 4,797,429 | 1/1989 | Thorpe | 521/167 |
| 5,060,291 | 10/1991 | Albertelli | 428/319.3 |

Primary Examiner—John Kight, III
Assistant Examiner—Terressa M. Mosley

[57] ABSTRACT

This invention relates to a foam, a foam-resin composite and a method of making foam-resin composites. The foam set forth in this invention comprises a urethane modified polyisocyanurate derived from an aromatic amino polyol and a polyether polyol. In addition to the polyisocyanurate foam, the composite of this invention further contains a resin layer, wherein the resin may be epoxy, bismaleimide, or phenolic resin. Such resins generally require cure or post-cure temperatures of at least 350° F.

47 Claims, No Drawings

FOAM, FOAM-RESIN COMPOSITE AND METHOD OF MAKING A FOAM-RESIN COMPOSITE

The invention described herein was made in the performance of work under NASA Contract No. NAS8-36200 and is subject to the provisions of Section 305 of the National Aeronautics and Space Act of 1958 (42 U.S.C. 2457).

BACKGROUND OF THE INVENTION

1. Field of the Invention

This invention relates to foam, a foam-resin composite, i.e., a composite comprising a core or layer derived from said foam and an integral resin layer, and a method of making a foam-resin composite. More particularly, this invention provides a formulation for a rigid, high density urethane modified polyisocyanurate foam which may be combined with a resin layer. The resin is an epoxy resin, a bismaleimide resin, a phenolic resin, or other resin which is cured or post-cured at a temperature of at least 350° F. The foam of this invention may be used in a variety of situations where dimensional stability at elevated temperatures, machinability, and light weight are factors of concern. Also, this foam may be used in a variety of manufacturing techniques to make composite or resin finished products. The foam-resin composite of this invention may be used in a variety of situations where high strength and light weight are factors of concern.

2. Description of the Related Art

For a variety of reasons and in a variety of products, it is often desired to combine a rigid foam with a layer of a high strength material, such as a resin, to form a composite having high strength yet low weight. A first type of foam-resin application is the fabrication of foam core panels or laminates for aerospace, aircraft, automobile, boat, surfboard, ski, skateboard, etc. In this application, the composite is used to form a strong, yet lightweight, structure where the foam provides functions such as structural reinforcement, or heat or noise insulation.

A second application of foam-resin composites is the construction of molds, models and prototypes. Here, a foam-resin composite may be desired because a foam may be shaped to the desired form and a resin may be applied to a surface having significant curvature or other non-uniformities.

While the combination of various foams and various resins to form foam-resin composites is generally known, foam-resin composites having a resin layer of epoxy resin, bismaleimide resin or phenolic resin and having cure or post-cure temperatures of at least 350° F. have uniformly been unsuccessful due to the high temperatures and/or pressures required to cure these resins and/or foam incompatibility with these resins. Known foams are unsuitable when using these resins because of dimensional instability at elevated temperatures, i.e., the foam volume shrinks significantly or otherwise does not hold the desired shape, lack of tensile strength, and low compressive strength, i.e., the foam will not maintain the desired shape in high temperature, high pressure cure/post-cure conditions.

There exists a need for a foam-resin composite, wherein the resin layer is formed of an epoxy resin, a bismaleimide resin, a phenolic resin, or other resins requiring cure or post-cure temperatures of at least 350° F., and the foam is formulated so as to maintain dimensional stability, provide suitable compressive and tensile strength, and avoid thermal or chemical degradation with these resins.

In addition the need exists to develop a foam which does not contribute to ozone depletion. Many commercial foams are made using chlorofluorocarbons as blowing agents in the production of the foam. Chlorofluorocarbons, including hydrogenated chlorofluorocarbons, are known to deplete the ozone in the earth's atmosphere. With these prior art foams, the chlorofluorocarbons are trapped within the closed cells when the rigid foam is produced. Thus, the chlorofluorocarbons produce a detrimental environmental effect both when the foam is produced and later, when it degrades and the closed cells release the entrapped chlorofluorocarbons, such as, for example in a landfill. Thus, there exists a need to manufacture foam in such a fashion as to avoid ozone depletion.

SUMMARY OF THE INVENTION

The invention relates to a foam, a foam-resin composite and a method for making a foam-resin composite. The foam of this invention comprises a rigid urethane modified polyisocyanurate foam having a density of about 5 to about 15 lb/ft$^3$. The foam exhibits good dimensional stability, good compressive strength, and resistance to thermal and chemical degradation. The foam may be used to produce composites when combined with a resin. The resin may be selected from the group consisting of epoxy resins, bismaleimide resins, phenolic resins, or other resins requiring cure or post-cure temperatures of at least 350° F.

DETAILED DESCRIPTION OF THE PREFERRED EMBODIMENTS

The present invention relates to a foam, a foam-resin composite and a method of making a foam-resin composite. The high density rigid foam of this invention is a two-component urethane modified polyisocyanurate. The foam-resin composite is formed of two integral parts, a foam section and a resin layer, which may be fiber reinforced. The resin layer is formed of a resin selected from the group of epoxy resin, bismaleimide (BMI) resin, phenolic resin, or other resins requiring cure or post-cure temperatures above 350° F., as discussed below. Generally, the foam section is first manufactured, either net shape molded or secondarily machined, either with a post cure or without a post cure, and then the resin layer or fiber reinforced resin layer is applied to the foam section.

The foam is produced from a two-component foam system, the components generally referred to as "A component" and "B component". The A component contains isocyanate and the B component generally contains a blend of polyols, surfactants, catalysts and water. The A and B components may be combined by hand mixing or foam making machines. The combination of the A and B components releases carbon dioxide ($CO_2$) which is utilized as a blowing agent in the foam manufacture. This mixture is then placed in a mold and allowed to cure for about one hour at about 120° F. to 140° F. If desired, the foam may be post cured by further heating the foam after the curing step.

The A component contains isocyanates having a functionality of at least about 2.4, preferably between about 2.4 and about 3.2, for example triisocyanates, polyisocyanates, or mixtures thereof. The organic isocyanates may be derived from aliphatic, cycloaliphatic, alicyclic, aromatic or aromatic aliphatic isocyanates. Aromatic isocyanates are generally preferred.

Among the many isocyanates suitable for the practice of the subject invention are, for example, aliphatic isocyanates such as tetramethylene. hexamethylene, octamethylene and decamethylene diisocyanates and their alkyl substituted homologs; cycloaliphatic isocyanates such as 1,2-, 1,3- and 1,4-cyclohexane diisocyanates, 2,4- and 2,6-methylcyclohexane diisocyanates, 4,4'- and 2,4'-dicyclohexyldiisocyanates, 4,4'- and 2,4'-dicyclohexylmethane diisocyanates, 1,3,5-cyclohexane triisocyanate, and saturated (hydrogenated) polymethylenepolyphenylenepolyisocyanates; alicyclic isocyanates such as isocyanatomethylcyclohexane isocyanates, isocyanatoethylcyclohexane isocyanates, bis(isocyanatomethyl)cyclohexane diisocyanates, 4,4'- and 2,4'-bis-(isocyanatomethyl)dicyclohexane, and isophorone diisocyanate; aromatic isocyanates such as 1,2-, 1,3-, and 1,4-phenylene diisocyanates, 2,4- and 2,6-toluene diisocyanate, 2,4'-, 4,4'-, and 2,2'-biphenyl diisocyanates, 2,2'-, 2,4'- and 4,4'-diphenylmethane diisocyanates, and polymethylene polyphenylene polyisocyanates (polymeric MDI); and aromatic aliphatic isocyanates such as 1,2-, 1,3-, and 1,4-xylene diisocyanates.

Most preferably, the A component contains 4,4'-diphenylmethane diisocyanate (MDI) prepolymers having a functionality of about 2.8 to 3.2, preferably with about 30-45% being in the monomer state, about 55-65% existing as higher polymers of MDI, with about 1-10% existing as 2,2 or 2,4 diphenylmethane diisocyanate. The preferred A component is marketed under the tradename "Mondur G 489", by Miles, Inc., Pittsburgh, Pa. This A component, as purchased, has a functionality (average number of reactive functional groups per molecule) of approximately 3.0, with a mol. wt. of approximately 415.

The B component contains about 60-90% of an aromatic amino polyol and about 5-35% of a polyether polyol, combined with trimerization catalyst(s), surfactant(s), and water.

The aromatic amino polyol may be any compound having the formula:

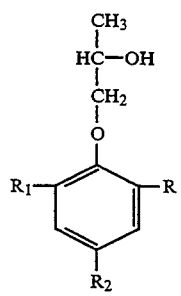

where R is

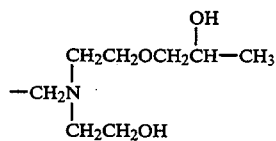

$R_1$ is hydrogen or R, and $R_2$ is hydrogen, R or the nonyl radical —$C_9H_{19}$. The preferred aromatic amino polyols have a functionality of about 3 to about 4. Most preferred are those set forth in U.S. Pat. Nos. 3,297,597 and 4,137,265, herein incorporated by reference. Such polyols include those marketed under the tradename "R350X" by Eastman Chemicals, Kingsport, Tenn. R350X has a hydroxyl number of 520-540 (mg KOH/g), a viscosity of about 15,000 cp @ 77° F., an equivalent weight of about 106, and a functionality of about 3. Most preferred, the aromatic amino polyol is about 60 to about 70 vol. % of the B component.

Suitable polyether polyols for use in this invention are polyalkylene polyether polyols such as the polymerization product of an alkylene oxide or of an alkylene oxide with a polyhydric alcohol. Any suitable polyhydric alcohol, including both aliphatic and aromatic, may be used such as glycerol, 1,1,1-trimethylolpropane, 1,1,1-trimethylolethane and hexane-1,2,6-triol. Also suitable are relatively high molecular weight polyoxyalkylene polyether polyols containing predominantly terminal oxypropylene oxide blocks (i.e., also containing predominantly terminal secondary OH-groups) which are produced by the usual methods. Such polyether polyols of this invention include polypropyleneether triols obtained by the chemical addition of propylene oxide to trihydroxyl organic containing materials, such as glycerol; 1,2,6-hexanetriol; 1,1-trimethylolethane; 1,1,1-trimethylolpropane; 3-(2-hydroxyethoxy)-1,2-propanediol; 3-(2-hydroxypropoxy)-1,2-propanediol; 2,4-dimethyl-2-(2-hydroxyethoxy) methylpentanedoil-1,5; 1,1,1-tris[(2-hydroxyethoxy)methyl]ethane; 1,1,1-tris[(2-hydroxypropoxy)methyl]-propane; and the like, as well as mixtures thereof. Preferably the polyether polyol is a triol polyol, i.e., having a functionality of about 3, which is produced by the propoxylation of glycerine to a mol. wt. of about 200 to about 700. The most preferred polyether polyol is marketed under the tradename "Voranol V2025" by Dow Chemical Company, Freeport, Tex. The polyether is present in an amount between about 5 to about 35 volume percent of the B component. Most preferred, the polyether polyol is about 25 to about 30 vol. % of the B component.

The trimerization catalyst may be any of a variety of known catalyst, including metal salts, alkali metal salts and tertiary amine trimerization catalysts which are well known to those skilled in the art. A great many catalysts are disclosed in the Journal of Cellular Plastics, December 1975, at page 329; and in U.S. Pat. Nos. 3,745,133, 3,896,052, 3,899,443, 3,903,018, 3,954,684 and 4,101,465, herein incorporated by reference. Suitable catalysts include, for example, strong bases such as quaternary ammonium hydroxides for example benzyltrimethylammonium hydroxide; alkali metal hydroxides such as sodium or potassium hydroxide; alkali metal alkoxides such as sodium methylate and potassium isopropylate; trialkylphosphines such as triethylphosphine; dialkylamino alkylphenols such as 2,4,6 tris(dimethylaminomethyl)phenol; 3- and/or 4-substituted pyridines such as 3- or 4- methylpyridine; metal organic salts such as sodium tetrakis(hydroxyethyl)borate; Friedel-Crafts catalysts such as aluminum chloride, ferric chloride, boron trifluoride, zinc chloride and alkali metal salts of weak organic acids and nitrophenols and imides such as potassium octanoate, potassium 2-ethylhexanoate, potassium benzoate, sodium picrate, and potassium phthalimide. Also used are the strongly basic N,N',N''-tris(dialkylaminoalkyl)-s-hexahydrotriazines such as N,N',N''-tris(dimethylaminopropyl)-s-hexahydrotriazine, optionally combined with aliphatic, low molecular mono and/or dicarboxylic acids such as acetic acid and/or adipic acids, or aromatic carboxylic acids such as benzoic acid. The trimerization catalyst is preferably a combination of a potassium salt trimerization catalyst and an amine trimerization catalyst. Preferably, the B component contains about 0.5-5% of a potassium salt trimerization catalyst. Particularly preferred are those sold under the tradename "T45" by Air Products Company, Lehigh Valley, Pa., which is a potassium alkyl hexoate/glycol blend. Most preferably, the potassium salt trimerization catalyst is about 1.8 to about 3.2 vol. % of the B component.

Commonly used tertiary amine catalysts include N-methylmorphorine, N,N,N',N'-tetramethylpropylene diamine, 1,4-diazabicyclo [2,2,2] octane, (DABCO), 1,8-diazabicyclo[5,4,0] undecene-7 and its salts such as the phenol salt, 2-ethylhexanoic acid salt and the like. The amine trimerization catalyst is preferably present as 0.5-5% of the B component and is preferably that marketed under the tradename "TMR4" by Air Products Company, Lehigh Valley, Pa., which is a tertiary amine/glycol blend. Most preferably, the tertiary amine trimerization catalyst is about 1.0 to about 1,8 vol. % of the B component.

While the surfactant may be any of a variety of known surfactants, preferably, the surfactant is a silicone base surfactant, which are generally polysiloxane-polyoxyalkylene block copolymers which are either linear or pendant block copolymers. Representatives of this type of surfactant are those sold commercially by Dow Chemical under the name DC-193, DC-195 DC-198 and the like. Most preferable are the surfactants marketed under the tradename "L5420" by Union Carbide Chemicals and Plastics Company, Danbury, Conn., which is a polyalkyleneoxidemethylsiloxane copolymer. Most preferably, the surfactant is about 2.0 to about 5.0 vol. % of the B component.

The B component also contains an amount of water sufficient to provide the required $CO_2$ as a blowing agent upon reaction with the MDI in the A component. Here, 100% of the blowing agent is $CO_2$ produced by the reaction of the A and B components; there is no need to use other physical blowing agents. This $CO_2$ is trapped in the closed cells of the rigid foam. Preferably, the B component contains about 0.5-1.5% water. This production and use of $CO_2$ as a blowing agent eliminates any concern relating to ozone depletion. Thus, the foam of the present invention is much more environmentally safe to produce and use than many other known foams, particularly those using chlorofluorocarbons.

Example 1 compares the foam of the present invention with a known commercial foam, which is generally a rigid polyisocyanurate foam having a density of 4-20 lb./ft.[3] and which is marketed as a foam providing good dimensional stability at high temperatures.

EXAMPLE 1

The A and B components were measured out such that the formulation for the foam tested was as follows:

|  | Overall Vol. % | % of A or B Component |
|---|---|---|
| A Component |  |  |
| G 489 | 89.247 | 100.00 |
| B Component |  |  |
| R350X | 6.859 | 63.79 |
| V2025 | 2.939 | 27.33 |
| T45 | 0.281 | 2.61 |
| TMR4 | 0.169 | 1.57 |
| L5420 | 0.392 | 3.65 |
| water | 0.113 | 1.05 |
|  | 10.753 | 100.00 |
| TOTAL | 100.000 |  |

The foam may be produced either by known hand mix methods or via use of a high or low pressure foam making machine. The following are the typical parameters for hand mix, hand pour processing:

| A Component Temperature, °F. | 65 to 105 |
|---|---|
| B Component Temperature, °F. | 65 to 105 |
| Mix Time, sec | 15 to 20 |
| Mold Temperature, °F. | 120 to 140 |
| Demold Time | One hour, if post cure not required |
| In Mold Post Cure, hrs/temp, °F. | 3/250 (typical, will vary with application) |

The following are the typical parameters for low pressure foam making machine processing:

| A Component Temperature, °F. | 65 to 105 |
|---|---|
| B Component Temperature, °F. | 65 to 105 |
| A/B Component Pressures, psi | 50 to 300 |
| Impeller Speed, RPM | 4,000 to 9,000 |

The above mixing methods and formulation yielded the following reactivity profiles for the foam:

| Ratio A/B | 8.3/1.0 |
|---|---|
| Component Temp., °F. | 72 |
| A/B weight, g | 410/49.4 |
| Mix Time, sec | 15 |
| Start of Rise, sec | 30 |
| Hard Gel, sec | 95-110 |
| Tack Free, sec | 140-155 |
| End of Rise, sec | 140-200 |
| Cup Density, lbs/ft[3] | 9-15 |

Where post cure is not desired, following the initial curing of the foam, the foam is generally allowed to sit at ambient conditions for one day to one week to further cure.

FOAM PROPERTY COMPARISON TABLE

| TEST | FOAM W/O POST CURE | | | FOAM W/POST CURE[6] | | | COMMERCIAL FOAM | | |
|---|---|---|---|---|---|---|---|---|---|
|  | avg. | n | StD | avg. | n | StD | avg. | n | StD |
| Volatile Test[1] (% wt. loss) | 8.8 | 2 | — | 7.8 | 2 | — | 14.6 | 2 | — |
| Dimensional Stability[2] (% volume change) | −0.1 | 2 | .06 | −.44 | 2 | .07 | −1.9 | 2 | .04 |
| Dimensional Stability[3] (% volume change) | −.4 | 4 | .28 | −.2 | 4 | .00 | −.55 | 4 | .19 |
| Dimensional Stability[4] | −.05 | 4 | .10 | −.05 | 4 | .00 | −.6 | 4 | .16 |

FOAM PROPERTY COMPARISON TABLE-continued

| TEST | FOAM W/O POST CURE | | | FOAM W/POST CURE[6] | | | COMMERCIAL FOAM | | |
|---|---|---|---|---|---|---|---|---|---|
| | avg. | n | StD | avg. | n | StD | avg. | n | StD |
| (% volume change) | | | | | | | | | |
| Density (lb/ft³) | 14.23 | 3 | — | 13.9 | 3 | — | 14.6 | 2 | — |
| Compressive Strength @ Amb T (Amb P) | 785.4 | 5 | 25.0 | 742.4 | 5 | 16.8 | 882.9 | 4 | 27.8 |
| Compressive Strength @ 125° F. (Amb P) | 710.6 | 5 | 12.4 | 590.8 | 5 | 83.1 | 750.7 | 5 | 40.3 |
| Compressive Strength @ 250° F. (Amb P) | 599.5 | 5 | 19.1 | 527.0 | 5 | 98.4 | 589.0 | 5 | 40.2 |
| Compressive Strength @ 500° F. (Amb P) | 509.5 | 5 | 18.1 | 454.6 | 5 | 28.9 | 61.4 | 5 | 28.4 |
| Tensile Strength @ Amb T (Amb P) | 270.1 | 5 | 40.9 | 196.9 | 5 | 18.6 | 233.4 | 5 | 21.4 |
| Tensile Strength @ 125° F. (Amb P) | 289.2 | 5 | 27.6 | 179.6 | 5 | 19.4 | 212.7 | 5 | 32.5 |
| Tensile Strength @ 250° F. (Amb P) | 217.2 | 5 | 11.6 | 224.7 | 5 | 20.0 | 138.5 | 5 | 18.1 |
| Tensile Strength @ 500° F. (Amb P) | No Test[5] | 5 | ~ | 75.12 | 5 | 24.5 | 14.0 | 5 | 12.6 |

[1] % Wt. loss when exposed to 550° F. for 60 minutes
[2] % Vol. change after 48 hrs. @ 275° F. oven, ambient pressure
[3] % Vol. change after 2 hrs. @ 250° F. oven with 29 in.hg. vacuum
[4] % Vol. change after 2 hrs. @ 350° F. oven with 29 in.hg. vacuum
[5] Specimens failed during heat up
[6] Post cure conditions: 3.5 hrs. @ 150° F., 18 hrs. @ 350° F.

As can be seen, the compressive strength, tested at 500° F., for the foam without post cure is approximately eight times higher than the known commercial foam. Also, the compressive strength, tested at 500° F., for the foam with post cure is approximately seven times higher than the known commercial foam. Further, the tensile strength, tested at 500° F., of the foam with post cure is approximately five times higher than the known commercial foam. Still further, the foam showed marked improvement in dimensional stability over the known commercial foam. Here, the foam had substantially less volume loss under all conditions tested.

In addition to the above noted advantages, it is also believed that the foam has better chemical compatibility with epoxy, BMI, and phenolic resins than known foams, i.e., the foam is more resistant to chemical degradation upon adhering these resins than known foams. The foam was compared with the known commercial foam in a variety of resin composite configurations and testing conditions. Here, the foam maintained its integrity and dimensional stability better than the known commercial foam.

Also, it is believed that the foam may be produced at a lower cost than known foams. This belief is based upon the raw material cost of the ingredients in the foam being approximately $17/ft.³, while the known commercial foam is sold by its distributor for approximately $77/ft.³.

The A component and B component may be combined at varying ratios. The formulation of Example 1 was at a A/B ratio of 8.3/1.0. Tests were conducted on a foam utilizing an A/B ratio of 4.15/1.0. Here, this foam performed nearly as well as that formed with the higher ratio of A component. The foam produced with an A/B ratio of 4.15/1.0 yielded a foam with the reactivity profile shown in Example 2.

EXAMPLE 2

The A and B components were formulated as in Example 1. The hand mix and foam machine parameters were also as shown in Example 1. At an A/B ratio of 4.15/1.0, the reactivity profile was as follows:

| | |
|---|---|
| Ratio A/B | 4.15/1.0 |
| Component Temp., °F. | 72 |
| A/B weight, g | 250/60.2 |
| Mix Time, sec | 10 |
| Start of Rise, sec | 18 |
| Hard Gel, sec | 57 |
| Tack Free, sec | 75 |
| End of Rise, sec | 105 |
| Cup Density, lbs/ft³ | 5.6 |

As shown, a lower A/B ratio produced a foam with a lower density. A lower density may be desired when lower weight is a primary concern, e.g., flight related applications. Also, a lower density foam generally provides better insulation qualities than a higher density foam. At the lower A/B ratio, the density is considerably lower, but there is little or no loss in physical properties. This lower density version would have the benefit of a lower cost per pound of finished product. Further, this density reduction is not believed to affect the overall strength of a foam-resin composite, as the majority of strength is attributed to the resin layer, rather than the foam section. The fact that this ratio may be varied to such a significant degree, provides the user with much flexibility to tailor a foam to his specific needs.

As noted above, the foam density is an important variable for foam-resin composites, not only for flight related applications, but also for boat hulls, surfboards, etc. With the foam of the present invention, the user has significant flexibility to adjust the density from about 5 lbs./ft.³ to about 15 lbs./ft.³ without significantly altering the other physical properties of the foam. Thus, when it is desired to produce a foam having a density of about 5 to about 8 lb/ft³, a ratio of about 3 to about 5 parts of the A component to 1 part of the B component is used; for a density of about 9 to about 15 lb/ft³, a ratio of about 6 to about 10 parts of the A component to 1 part of the B component is used.

As evidenced by Example 1, the foam of the present invention may be used in either a state where there has not been a post cure or in a state where a post cure has been applied. The need for post curing or the post cure conditions vary with the desired application. The purpose of the post cure step is to provide further cross-linking of the polymers in the foam to provide a more stabilized foam. The post cure conditions, depending on the application, may vary from a temperature of about 250° for 4 hours to a temperature of 350° for 18 hours. It is generally preferred to post cure the foam in the mold, rather than out of the mold, and at about 350° F. for about 3 ½ hours.

As noted, it is advantageous to post cure in some applications while post curing is not advantageous in others. This is illustrated by the following examples. In a filament winding application, a foam core, shaped to a predetermined shape, is wound with fibers impregnated with resin so as to form an exterior resin layer on the foam core. After filament winding, the resin is cured by heating. In this application, it is often advantageous that the foam is not post cured, as the heating to cure the resin causes the foam to expand somewhat, thereby exerting an "internal pressure" about the filament winding. This internal pressure aids in maintaining the desired shape of the resin layer. In these applications, often the foam core is removed, and this internal pressure helps to form a suitable internal surface of the resin layer. Post curing of the foam is generally preferred when the foam is used in a parasitic application, i.e., the foam is intended to remain as an integral part of the finished product. In this situation post curing provides a foam with increased stability which is desired when the foam is not to be removed from the resin layer.

The foam may be shaped for panels, laminates, molds, models, and prototypes in a variety of ways which are generally known in the art. The precured foam, i.e., liquid foam, may be poured into a mold such that the foam takes on the desired final shape, i.e., net shape molded.

Also, for the resin applications, the pre-cured foam mixture may be poured into a standard mold, such as a rectangular or cylindrical mold, and the standard shape may be further shaped by lathe, milling machine, or otherwise shaped so as to produce the desired shape, i.e., secondarily machined.

When the pre-cured foam is poured into a mold, mold release agents should be used. It has been found that non-silicone wax release agents and silicone based spray-on mold release agents work suitably with the foam of the present invention.

The resin layer may be applied or adhered in a variety of known ways to the foam section of the foam-resin composite. Such methods of adhering the resin include spraying, filament winding, and hand or machine lay-up procedures. Generally, it is preferred that the resin layer contains reinforcing fibers or filament to strengthen the resin layer. These fibers or filaments may generally be any suitable fibers or filaments which are known in the art, e.g., graphite, glass, kevlar or other.

Epoxy, BMI and phenolic resins have the advantage of being able to withstand higher in-use temperatures than other resins. Generally, the higher the resin cure temperature, the higher the design temperature (in-use temperature) of the finished product. Thus, there is an incentive to cure at higher temperatures. However, prior to this invention, these resins could not be cured at the optimum, higher temperatures, as the higher temperatures (and pressures) required to optimumly cure the resins has resulted in thermal degradation or breakdown of the known foams, thus resulting in failure of the known foam-resin combinations.

Generally, depending upon the application, epoxy resins may be cured at temperatures of 325°–350° F. or higher and at pressures of 5 psig or higher. BMI resin may generally be cured at temperatures of 375°–450° F. or higher with pressures ranging from 85 to 100 psig or higher. Phenolic resin may generally be cured at temperatures of 350°–375° F. or higher and at pressures of 25 psig or higher.

As known foams are found to fail or lose dimensional stability particularly at temperatures above 350° F., it is generally more difficult to find a known foam which is suitable for use with a BMI resin than with epoxy resin and hence, though this invention relates to the use of epoxy resin, it is particularly applicable to BMI resin and phenolic resin which require higher cure temperatures. Also, many known foams fail as BMI and phenolic resins typically require even higher post cure temperature to finish cross-linking of the resin. Post cure conditions are typically in the range of 20° to 75° above cure temperatures.

It is believed that the tri-functional polyols, the production of urea upon reaction of the MDI and water, and the subsequent reaction between the urea and MDI, combine to significantly increase cross-linkage and cross-branching of the foam, such that it is suitable for the high temperature and/or pressure curing requirements with epoxy, BMI, phenolic resins and other resins requiring cure or post-cure temperatures above 350° F.

The foam may be the desired finished product, or the foam may be an intermediary to a foam-resin composite.

The foam-resin composite may be the desired finished product, or the foam-resin composite may be an intermediary to a finished product wherein the foam section is partially or completely removed. Often, it is desired to produce a product made from resin which has a hollow section. In this situation the hollow section may initially be filled with the inventive foam, and the resin applied about the foam. Then, after the resin is suitably cured, including post curing if desired, the foam is removed by water blasting or carbon dioxide blasting, resulting in a hollow, open space where the foam had existed.

Although the invention has been described with reference to its preferred embodiments, those of skill in the art may from this description appreciate changes and modifications which can be made therein which do not depart from the scope and spirit of the invention as described hereafter.

What is claimed is:

1. A urethane modified polyisocyanurate riged foam comprising the reaction product of:
   an A component comprising polymeric isocyanate having a functionality of at least 2.4;
   a B component comprising:
   an aromatic amino polyol having the formula

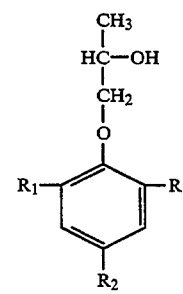

-continued
where R is

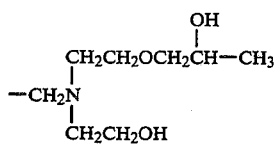

$R_1$ is hydrogen or R, and $R_2$ is hydrogen, R or the nonyl radical $-C_9H_{19}$, said aromatic amino polyol being about 60 to about 90 vol. % of the B component;

a polyether polyol, said polyether polyol being about 5 to about 35 vol. % of the B component;

a trimerization catalyst;

a surfactant;

an amount of water sufficient to provide, upon reaction of the A and B components, $CO_2$ as the sole blowing agent;

wherein the foam has a density of about 5 to about 15 lb./ft$^3$.

2. The rigid foam of claim 1, wherein the polymeric isocyanate is polymeric 4,4'-diphenylmethane diisocyanate.

3. The rigid foam of claim 1 wherein the trimerization catalyst is a combination of two catalysts.

4. The rigid foam of claim 3 wherein the trimerization catalyst consists of an amine catalyst and a potassium salt catalyst.

5. The rigid foam of claim 1, wherein the surfactant is a silicone based surfactant.

6. The rigid foam of claim 5, wherein the silicone based surfactant is polyalkyleneoxidimethylsiloxane copolymer.

7. The rigid foam of claim 1, wherein the A component is combined with the B component in a ratio of about 6 to about 10 parts of the A component to 1 part of the B component.

8. The rigid foam of claim 1, wherein the A component is combined with the B component in a ratio of about 3 to about 5 parts of the A component to 1 part of the B component.

9. The rigid foam of claim 1, wherein the aromatic amino polyol is about 60 to about 70 vol. % of the B component.

10. The rigid foam of claim 1, wherein the polyether polyol is about 25 to about 30 vol. % of the B component.

11. A method of making a foam-resin composite, comprising the steps of:

combining an A component with a B component to induce formation of a urethane modified polyisocyanurate rigid foam having a density of about 5 to about 15 lb./ft$^3$;

the A component comprising a polymeric isocyanate having a functionality of at least 2.4;

the B component comprising:

an aromatic amino polyol having the formula

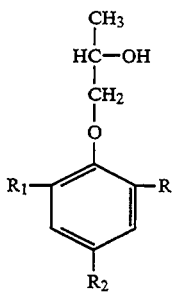

where R is

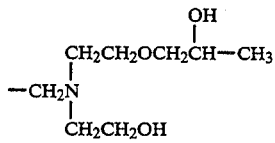

$R_1$ is hydrogen or R, and $R_2$ is hydrogen, R or the nonyl radical $-C_9H_{19}$, said aromatic amino polyol being about 60 to about 90 vol. % of the B component;

a polyether polyol, said polyether polyol being about 5 to about 35 vol. % of the B component;

a trimerization catalyst;

a surfactant;

an amount of water sufficient to provide, upon reaction of the A and B components, $CO_2$ as the sole blowing agent;

curing the foam;

adhering to the foam a resin layer containing a resin selected from the group consisting of epoxy resin, bismaleimide resin and phenolic resin;

curing the resin layer at elevated temperature.

12. The method of claim 11, wherein the polymeric isocyanate is polymeric 4,4'-diphenylmethane diisocyante.

13. The rigid foam of claim 11 wherein the polyether polyol has a functionality of about 3.0 and a molecular weight of about 200 to about 700.

14. The rigid foam of claim 11 wherein the trimerization catalyst is a tertiary amine.

15. The method of claim 11, wherein the surfactant is a silicone based surfactant.

16. The method of claim 15, wherein the silicone based surfactant is polyalkyleneoxidemethylsiloxane copolymer.

17. The method of claim 11, wherein the A component is combined with the B component in a ratio of about 6 to about 10 parts of the A component to 1 part of the B compartment.

18. The method of claim 11, wherein the A component is combined with the B component in a ratio of about 3 to about 5 parts of the A component to 1 part of the B component.

19. The method of claim 11, wherein the aromatic amino polyol is about 60 to about 70 vol. % of the B component.

20. The method of claim 11, wherein the polyether polyol is about 25 to about 30 vol. % of the B component.

21. The method of claim 11, wherein the resin layer includes reinforcing fibers.

22. The method of claim 11, further comprising the step of forming the foam into a predetermined shape prior to adhering the resin layer.

23. A cured foam-resin composite, comprising:
(A) a urethane modified polyisocyanurate rigid foam produced by the process of reacting an A component with a B component;
the A component comprising a polymeric isocyanate having a functionality of at least 2.4;
the B component comprising:
an aromatic amino polyol having the formula

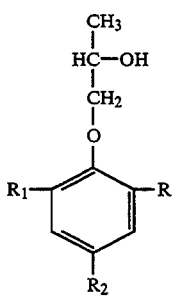

where R is

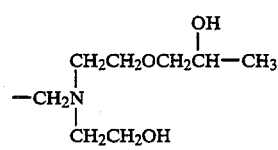

$R_1$ is hydrogen or R, and $R_2$ is hydrogen, R or the nonyl radical —$C_9H_{19}$, said aromatic amino polyol being about 60 to about 90 vol. % of the B component;
a polyether polyol, said polyether polyol being about 5 to about 35 vol. % of the B component;
a trimerization catalyst;
a surfactant;
an amount of water sufficient to provide, upon reaction of the A and B components, $CO_2$ as the sole blowing agent; and
(B) an integral resin layer applied over said foam containing a resin selected form the group consisting of epoxy resin, bismaleimide resin and phenolic resin.

24. The composite of claim 23, wherein the polymeric isocyanate is polymeric 4,4'-diphenylmethane diisocyanate.

25. The composite of claim 23 wherein the polyether polyol has a functionality of about 3.0 and a molecular weight of about 200 to about 700.

26. The composite of claim 23 wherein the trimerization catalyst consists of a tertiary amine catalyst and a potassium salt catalyst.

27. The composite of claim 23, wherein the surfactant is a silicone based surfactant.

28. The composite of claim 27, wherein the silicone based surfactant is polyalkyleneoxidimethylsiloxane copolymer.

29. The composite of claim 23, wherein the A component is combined with the B component in a ratio of about 6 to about 10 parts of the A component to 1 part of the B component.

30. The composite of claim 23, wherein the A component is combined with the B component in a ratio of about 3 to about 5 parts of the A component to 1 part of the B component.

31. The composite of claim 23, wherein the aromatic amino polyol is about 60 to about 70 vol. % of the B component.

32. The composite of claim 23, wherein the polyether polyol is about 25 to about 30 vol. % of the B component.

33. The composite of claim 23, wherein the resin layer includes reinforcing fibers.

34. The rigid foam of claim 1 wherein the polyether polyol has a functionality of about 3.0 and a molecular weight of about 200 to about 700.

35. The rigid foam of claim 1 wherein the trimerization catalyst is a tertiary amine.

36. The rigid foam of claim 34, wherein the polyether polyol is alkoxylated glycerine.

37. The rigid foam of claim 4, wherein the potassium salt trimerization catalyst is potassium alkyl hexoate.

38. The rigid foam of claim 4 wherein the amine catalyst is a tertiary amine catalyst.

39. The rigid foam of claim 38 wherein the potassium salt catalyst is a blend of potassium alkyl hexoate and a glycol.

40. The rigid foam of claim 13, wherein the polyether polyol is alkoxylated glycerine.

41. The rigid foam of claim 11 wherein the trimerization catalyst is a combination of two catalysts.

42. The rigid foam of claim 41 wherein the trimerization catalyst consists of a tertiary amine catalyst and a potassium salt catalyst.

43. The method of claim 42, wherein the potassium salt trimerization catalyst is potassium alkyl hexoate.

44. The composite of claim 25, wherein the polyether polyol is alkoxylated glycerine.

45. The composite of claim 23 wherein the trimerization catalyst is a tertiary amine.

46. The composite of claim 23 wherein the trimerization catalyst is a combination of two catalysts.

47. The composite of claim 26, wherein the potassium salt trimerization catalyst is potassium alkyl hexoate.

* * * * *